United States Patent
Son et al.

(10) Patent No.: US 11,924,315 B2
(45) Date of Patent: Mar. 5, 2024

(54) METHOD AND APPARATUS FOR SESSION CONFIGURATION OF TERMINAL ACCORDING TO TIME OR SERVICE AREA IN WIRELESS COMMUNICATION SYSTEM

(71) Applicant: Samsung Electronics Co., Ltd., Suwon-si (KR)

(72) Inventors: Jungje Son, Suwon-si (KR); Jicheol Lee, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,412

(22) Filed: Apr. 30, 2020

(65) Prior Publication Data

US 2020/0351391 A1    Nov. 5, 2020

(30) Foreign Application Priority Data

May 3, 2019    (KR) .......................... 10-2019-0052238

(51) Int. Cl.
*H04L 69/322* (2022.01)
*H04L 67/14* (2022.01)
(Continued)

(52) U.S. Cl.
CPC ............ *H04L 69/322* (2013.01); *H04L 67/14* (2013.01); *H04W 8/26* (2013.01); *H04W 36/14* (2013.01);
(Continued)

(58) Field of Classification Search
None
See application file for complete search history.

(56) References Cited

U.S. PATENT DOCUMENTS

2016/0006571 A1*    1/2016    Teittinen ............... H04M 15/66
                                                                455/405
2017/0339609 A1    11/2017    Youn et al.
(Continued)

FOREIGN PATENT DOCUMENTS

CN          109246853 A        1/2019
CN          109673061 A        4/2019
(Continued)

OTHER PUBLICATIONS

"3rd Generation Partnership Project; Technical Specification Group Services and System Aspects; Procedures for the 5G System; Stage 2 (Release 16)", 3GPP TS 23.502 V16.0.0 (Mar. 2019), 420 pages.
(Continued)

*Primary Examiner* — Chirag G Shah
*Assistant Examiner* — Suk Jin Kang (57) ABSTRACT

The disclosure relates to a communication method and system for converging a 5G communication system for supporting higher data rates beyond a 4G system with an IoT technology. The disclosure may be applied to intelligent services based on the 5G communication technology and the IoT-related technology, such as smart home, smart building, smart city, smart car or connected car, healthcare, digital education, retail, security and safety-related services. Various embodiments of the disclosure may provide a session management method of a terminal in a mobile communication system. A method performed by a SMF entity in a wireless communication system includes receiving, from an AMF entity, a first message for requesting a PDU session configuration, determining whether the configuration of the PDU session is allowed, and transmitting, to the AMF entity, a second message for establishing the PDU session in case that the configuration of the PDU session is allowed.

16 Claims, 8 Drawing Sheets

(51) Int. Cl.
*H04W 8/26* (2009.01)
*H04W 36/14* (2009.01)
*H04W 48/18* (2009.01)
*H04W 76/11* (2018.01)
*H04W 80/10* (2009.01)

(52) U.S. Cl.
CPC ............ *H04W 48/18* (2013.01); *H04W 76/11* (2018.02); *H04W 80/10* (2013.01)

(56) References Cited

U.S. PATENT DOCUMENTS

| | | | |
|---|---|---|---|
| 2018/0192390 A1* | 7/2018 | Li | H04W 36/14 |
| 2018/0192471 A1* | 7/2018 | Li | H04W 12/06 |
| 2018/0199243 A1 | 7/2018 | Bharatia | |
| 2018/0270877 A1 | 9/2018 | Lee et al. | |
| 2019/0007500 A1* | 1/2019 | Kim | H04L 67/141 |
| 2019/0053308 A1* | 2/2019 | Castellanos Zamora | H04L 65/1073 |
| 2019/0059067 A1 | 2/2019 | Lee et al. | |
| 2019/0098537 A1 | 3/2019 | Qiao et al. | |
| 2019/0116486 A1* | 4/2019 | Kim | H04W 8/10 |
| 2019/0124561 A1* | 4/2019 | Faccin | H04W 48/18 |
| 2019/0158408 A1* | 5/2019 | Li | H04L 45/306 |
| 2019/0200264 A1 | 6/2019 | Kim et al. | |
| 2019/0254118 A1* | 8/2019 | Dao | H04L 67/141 |
| 2020/0015314 A1* | 1/2020 | Dao | H04W 36/14 |
| 2020/0053562 A1* | 2/2020 | Kim | H04W 8/02 |
| 2020/0053828 A1* | 2/2020 | Bharatia | H04W 76/11 |
| 2020/0092424 A1* | 3/2020 | Qiao | H04M 15/8033 |
| 2020/0107213 A1* | 4/2020 | Park | H04L 41/0806 |
| 2020/0120752 A1 | 4/2020 | Hu et al. | |
| 2020/0128503 A1* | 4/2020 | Li | H04W 28/02 |
| 2020/0145538 A1* | 5/2020 | Qiao | H04M 15/85 |
| 2020/0145876 A1* | 5/2020 | Dao | H04W 80/10 |
| 2020/0196382 A1* | 6/2020 | Kawasaki | H04L 29/08 |
| 2020/0205226 A1* | 6/2020 | Xiong | H04W 36/00 |
| 2020/0228936 A1* | 7/2020 | Talebi Fard | H04W 4/08 |
| 2020/0267786 A1* | 8/2020 | Qiao | H04L 12/14 |
| 2020/0296221 A1* | 9/2020 | Zhou | H04W 28/0268 |
| 2020/0314731 A1* | 10/2020 | Ryu | H04W 48/12 |
| 2020/0336321 A1* | 10/2020 | Ding | H04M 15/00 |
| 2020/0344638 A1* | 10/2020 | Ding | H04M 15/66 |
| 2020/0351409 A1* | 11/2020 | Karampatsis | H04L 67/14 |
| 2020/0351980 A1* | 11/2020 | Talebi Fard | H04W 68/00 |
| 2020/0351985 A1* | 11/2020 | Zhu | H04M 15/66 |
| 2020/0367115 A1* | 11/2020 | Kim | H04W 88/14 |
| 2020/0367297 A1* | 11/2020 | Dao | H04W 8/186 |
| 2020/0374352 A1* | 11/2020 | Ge | H04W 76/11 |
| 2020/0389811 A1* | 12/2020 | Guo | H04M 15/8016 |
| 2021/0084569 A1* | 3/2021 | Kim | H04W 48/08 |
| 2021/0092707 A1* | 3/2021 | Ryu | H04W 8/24 |
| 2021/0099943 A1* | 4/2021 | Dannebro | H04M 15/66 |
| 2021/0105328 A1* | 4/2021 | Zong | H04W 60/04 |
| 2021/0105784 A1* | 4/2021 | Young | H04W 48/18 |
| 2021/0112565 A1* | 4/2021 | Bhaskaran | H04W 24/08 |
| 2021/0112620 A1* | 4/2021 | Yin | H04W 76/11 |
| 2021/0120462 A1* | 4/2021 | Chen | H04W 8/02 |
| 2021/0120596 A1* | 4/2021 | Youn | H04W 28/02 |
| 2021/0120620 A1* | 4/2021 | Wang | H04W 76/25 |
| 2021/0127255 A1* | 4/2021 | Li | H04W 8/08 |
| 2021/0127271 A1* | 4/2021 | Wu | H04W 28/0842 |
| 2021/0127442 A1* | 4/2021 | Tang | H04W 76/15 |
| 2021/0168151 A1* | 6/2021 | Sun | H04W 76/12 |
| 2021/0168658 A1* | 6/2021 | Yu | H04W 28/0236 |
| 2021/0218585 A1* | 7/2021 | Zhu | H04M 15/8044 |
| 2021/0227598 A1* | 7/2021 | Xin | H04W 28/0268 |
| 2021/0235542 A1* | 7/2021 | Li | H04L 12/1407 |
| 2021/0250446 A1* | 8/2021 | Qiao | H04W 28/24 |
| 2021/0274436 A1* | 9/2021 | Sun | H04W 28/0268 |
| 2021/0282049 A1* | 9/2021 | Sun | H04L 12/1407 |
| 2021/0297536 A1* | 9/2021 | Qiao | H04M 15/00 |
| 2021/0211938 A1* | 10/2021 | Li | H04B 17/309 |
| 2021/0314795 A1* | 10/2021 | Li | H04B 17/309 |
| 2021/0377138 A1* | 12/2021 | Sun | H04L 41/0893 |
| 2022/0116814 A1* | 4/2022 | Di Girolamo | H04W 4/027 |
| 2022/0174539 A1* | 6/2022 | Dao | H04W 8/08 |

FOREIGN PATENT DOCUMENTS

| | | |
|---|---|---|
| EP | 3462770 A1 | 4/2019 |
| WO | 2018/034924 A1 | 2/2018 |
| WO | 2018/140384 A1 | 8/2018 |
| WO | 2018/174373 A1 | 9/2018 |

OTHER PUBLICATIONS

"3rd Generation Partnership Project; Technical Specification Group Services and System Aspects; System Architecture for the 5G System; Stage 2 (Release 16)", 3GPP TS 23.501 V16.0.2 (Apr. 2019), 6 pages.
International Search Report dated Aug. 6, 2020 in connection with International Patent Application No. PCT/KR2020/005697, 3 pages.
Written Opinion of the International Searching Authority dated Aug. 6, 2020 in connection with International Patent Application No. PCT/KR2020/005697, 5 pages.
European Search Report dated Aug. 31, 2020 in connection with European Patent Application No. 20 17 2472, 10 pages.
Notification of the First Office Action dated Feb. 1, 2021 in connection with Chinese Application No. 202010361233.X, 23 pages.
Notice of Allowance dated Sep. 3, 2021 in connection with Chinese Patent Application No. 202010361233.X, 8 pages.
Office Action dated Nov. 23, 2023, in connection with Korean Patent Application No. 10-2019-0052238, 9 pages.
Office Action dated Dec. 11, 2023, in connection with Japanese Patent Application No. 2021-565794, 3 pages.
Ericsson, "Charging requirements and functional description," 3GPP TSG SA WG2 Meeting #132, S2-1903290, Xi''An, China, Apr. 8-12, 2019, 12 pages.
3GPP TS 23.502, V16.0.1, (Apr. 2019) Technical Specification; 3rd Generation Partnership Project; Technical Specification Group Services and System Aspects; Procedures for the 5G System; Stage 2 (Release 16); 420 pages.
China Mobile et al, "Clarification of UDR usage in policy related procedures," 3GPP TSG SA WG2 Meeting #126, S2-182620, Montreal, Canada, Feb. 26-Mar. 2, 2018, 16 pages.

* cited by examiner

METHOD AND APPARATUS FOR SESSION CONFIGURATION OF TERMINAL ACCORDING TO TIME OR SERVICE AREA IN WIRELESS COMMUNICATION SYSTEM

CROSS-REFERENCE TO RELATED APPLICATION

This application is based on and claims priority under 35 U.S.C. § 119 to Korean Patent Application No. 10-2019-0052238, filed on May 3, 2019, in the Korean Intellectual Property Office, the disclosure of which is incorporated herein by reference in its entirety.

BACKGROUND

1. Field

The disclosure relates to a method for session management of a terminal in a wireless communication system.

2. Description of Related Art

To meet the increasing demand for wireless data traffic since the deployment of a 4th generation (4G) communication systems, efforts have been made to develop an improved 5th generation (5G) or pre-5G communication system. Therefore, the 5G or pre-5G communication system is also called a "beyond 4G network" communication system or a "post long term evolution (LTE) System."

Implementation of the 5G communication system in ultra-high frequency (mmWave) bands, such as, for example, 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQAM) and sliding window superposition coding (SWSC), as advanced coding modulation (ACM) systems, and filter bank multicarrier (FBMC), non-orthogonal multiple access (NOMA), and sparse code multiple access (SCMA), as advanced access technologies, have been developed.

In the 5G system, it has been considered to support various services in comparison with the existing 4G system. For example, the most representative services may be enhanced mobile broadband (eMBB), ultra-reliable low-latency communication (URLLC), massive machine type communication (mMTC), evolved multimedia broadcast/multicast service, and the like. Further, a system providing the URLLC service may be called a URLLC system, and a system providing the eMBB service may be called an eMBB system. Further, the terms "service" and "system" may be interchangeably used.

Among them, the URLLC service is a service that is newly considered in the 5G system in contrast with the existing 4G system, and it should satisfy ultra-high reliability (e.g., packet error rate of about $10^{-5}$) and low latency (e.g., about 0.5 msec) requirements in comparison with other services. In order to satisfy such severe requirements, the URLLC service may require an application of a transmit time interval (TTI) that is shorter than that of the eMBB service, and various operating schemes using this are under consideration.

On the other hand, the Internet, which is a human-centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as sensing technology, wired/wireless communication and network infrastructure, service interface technology, and "security technology," have been demanded for IoT implementation, and thus technologies, such as a sensor network, machine-to-machine (M2M) communication, machine type communication (MTC) for a connection between things, have recently been researched.

An IoT environment may provide intelligent Internet technology (IT) services that create a new value for human life by collecting and analyzing data generated among connected things. IoT may be applied in a variety of contexts, including smart homes, smart buildings, smart cities, smart cars or connected cars, smart grids, health care, smart appliances, and advanced medical services, through convergence and combination between existing information technology (IT) and various industrial applications.

Accordingly, various attempts have been made to apply the 5G communication system to IoT networks. For example, technologies of sensor network, machine to machine (M2M) communication, and machine type communication (MTC) have been implemented by techniques for beamforming, MIMO, and array antennas, which correspond to the 5G communication technology. As the big data processing technology as described above, application of a cloud radio access network (cloud RAN) would be an example of convergence between the 5G technology and the IoT technology.

SUMMARY

Certain embodiments according to this disclosure provide a methods for controlling a protocol data unit (PDU) session connection configuration through identification of whether a PDU session connection is possible according to a possible service area and a possible time of a corresponding PDU session in the case of the PDU session connection configuration between a mobile communication terminal and a system when the mobile communication terminal attempts the session configuration for data transmission and reception. Further, some embodiments according to this disclosure provide a method and an apparatus for releasing a PDU session connection through sensing of a case where a terminal deviates from a service area or a serviceable time elapses.

The technical solutions provided by certain embodiments according to this by the disclosure are not limited to the aforementioned functionalities, and further technical solutions and additional embodiments could be clearly understood by those of ordinary skill in the art to which this disclosure pertains.

In certain embodiments according to this disclosure, a method performed by a session management function (SMF) entity in a wireless communication system is provided. The method includes receiving, from an access and mobility management function (AMF) entity, a first message for requesting a protocol data unit (PDU) session configuration; determining whether the configuration of the PDU session is allowed based on at least one of a location of a terminal or a time related to receiving the first message; and transmitting, to the AMF entity, a second message for establishing the PDU session in case that the configuration of the PDU session is allowed.

In some embodiments, the first message includes at least one of information on a network slice, information on a data network name, an identifier of the terminal, information on the location of the terminal, or information on an access network of the terminal.

In certain embodiments, the determining includes: transmitting, to a policy and control function (PCF) entity, a third message for applying policy and charging control rule to the PDU session; receiving, from the PCF entity, a fourth message including validation rule information indicating at least one of a location or a time allowed for the configuration of the PDU session; and determining whether the configuration of the PDU session is allowed based on the validation rule information and at least one of the location of the terminal or the time related to receiving the first message.

In at least one embodiment, the method further includes: determining whether to release the PDU session based on at least one of a current location of the terminal or a current time; and transmitting, to the AMF entity, a fifth message for releasing the PDU session in case of determining to release the PDU session.

Certain embodiments according to this disclosure further comprise a method performed by a policy and control function (PCF) entity in a wireless communication system.

In some embodiments, the method includes: receiving, from a session management function (SMF) entity, a first message for applying policy and charging control rule to a protocol data unit (PDU) session; determining whether a configuration of the PDU session is allowed based on at least one of a location of a terminal or a time related to receiving the first message; and transmitting, to the SMF entity, a second message indicating that the configuration of the PDU session is allowed in case that the configuration of the PDU session is allowed.

In at least one embodiment, the first message includes at least one of information on a network slice, information on a data network name, an identifier of the terminal, information on the location of the terminal, or information on an access network of the terminal. In various embodiments, the second message includes validation rule information indicating at least one of a location or a time allowed for the configuration of the PDU session.

In certain embodiments, the method further includes: determining whether to release the PDU session based on at least one of a current location of the terminal or a current time; and transmitting, to the SMF entity, a fifth message for releasing the PDU session in case of determining to release the PDU session.

Certain embodiments according to this disclosure further comprise a session management function (SMF) entity in a wireless communication system.

In some embodiments, the SMF entity includes: a transceiver; and a controller configured to: receive, from an access and mobility management function (AMF) entity via the transceiver, a first message for requesting a protocol data unit (PDU) session configuration, determine whether the configuration of the PDU session is allowed based on at least one of a location of a terminal or a time related to receiving the first message, and transmit, to the AMF entity via the transceiver, a second message for establishing the PDU session in case that the configuration of the PDU session is allowed.

Certain embodiments according to this disclosure comprise a policy and control function (PCF) entity in a wireless communication system. In some embodiments, the PCF entity includes: a transceiver; and a controller configured to: receive, from a session management function (SMF) entity via the transceiver, a first message for applying policy and charging control rule to a protocol data unit (PDU) session, determine whether a configuration of the PDU session is allowed based on at least one of a location of a terminal or a time related to receiving the first message, and transmit, to the SMF entity via the transceiver, a second message indicating that the configuration of the PDU session is allowed in case that the configuration of the PDU session is allowed.

According to at least one embodiment of this disclosure, during the PDU session connection with the terminal in the mobile communication system, resources related to the PDU session transmission of the mobile communication system can be efficiently managed by controlling a load caused by an unnecessary PDU session connection management of a mobile communication operator or wrong PDU session connection according to the service area and the time.

Embodiments according to this disclosure are not limited to the aforementioned, and other unmentioned embodiments and technical benefits can be clearly understood by those of ordinary skill in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operational principles of the disclosure will be described in detail with reference to the accompanying drawings. In describing certain embodiments according to this disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be construed in view of the instant specification in its entirety.

In the following description, a term to identify an access node, a term to denote network entities, a term to denote messages, a term to denote an interface between network entities, and a term to denote a various types of identity information have been exemplified for convenience of description. Accordingly, the disclosure is not limited to the following terms, and other terms to denote targets having equivalent technical meanings may be used.

In the disclosure, for convenience in explanation, terms and names defined in the 3rd Generation Partnership Project Long Term Evolution (3GPP LTE) standards are used. However, the disclosure is not restricted by the terms and names, and it may be equally applied to systems complying with other standards.

Figure 1:
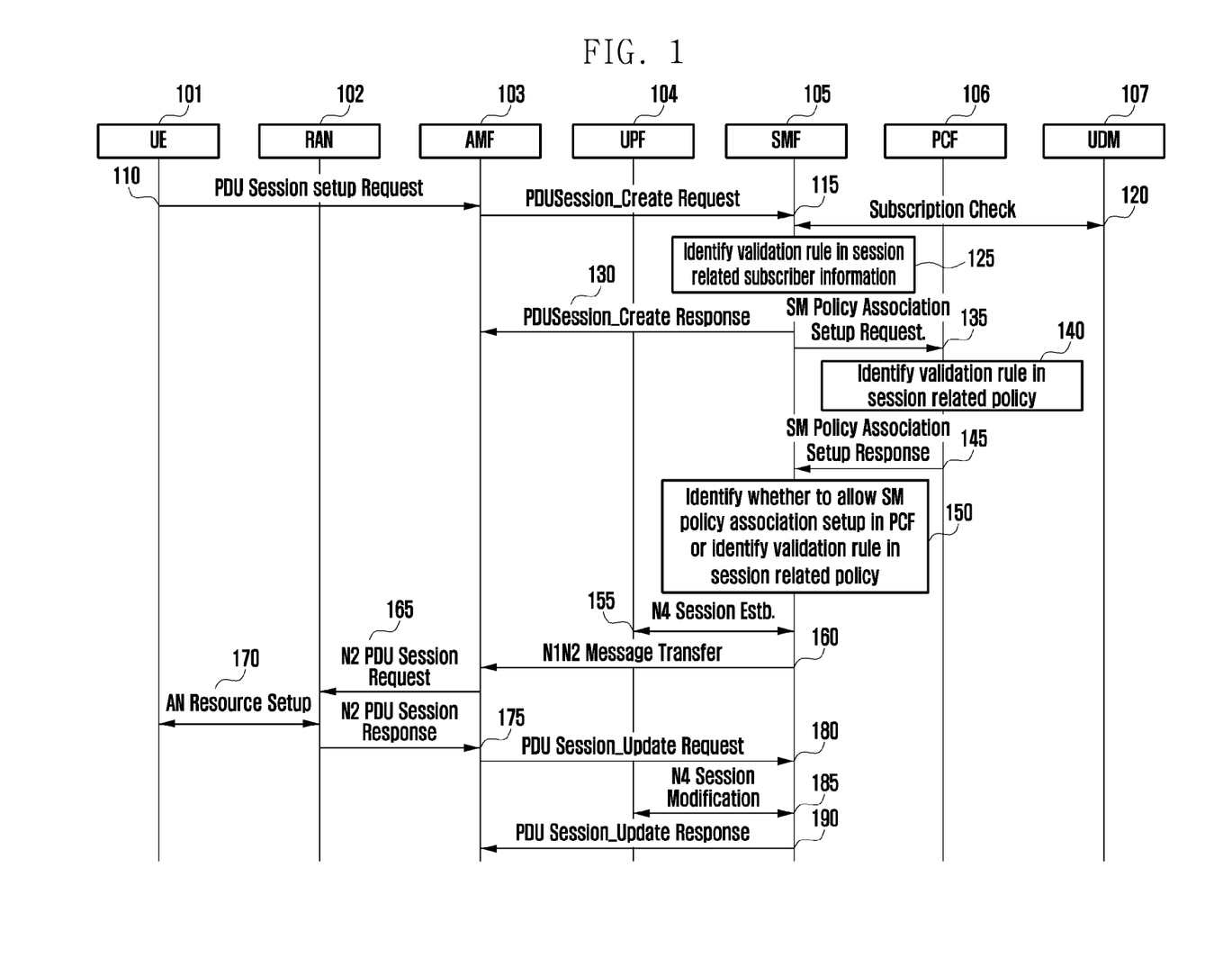
FIG. 1 illustrates an example of procedure of configuring a PDU session connection according to certain embodiments of this disclosure.

FIG. 1 illustrates an example of a procedure of configuring a PDU session connection according to certain embodiments of this disclosure.

With reference to the illustrative example of FIG. 1, a terminal 101, at operation 110, transmits a protocol data unit (PDU) session setup request for PDU session configuration to an access and mobility management function (AMF) 103 in order to perform necessary services in the terminal 101 according to user equipment (UE) route selection policy (URSP) configured in the terminal or other methods. In this case, the PDU session setup request of the terminal 101 may include a PDU session identifier or identification (ID) designating a PDU session requested by the terminal 101, network slice information to which the PDU session belongs, and data network name (DNN) information.

In certain embodiments, at operation 115, the AMF 103 may select a session management function (SMF) 105 capable of managing a connection of the requested PDU session based on the data network name (DNN) information and the network slice information included in the PDU session setup request received from the terminal 101, and the AMF 103 may transmit a PDU session create request for requesting the PDU session connection configuration of the terminal to the selected SMF 105. In this case, the transmitted PDU session create request may include the PDU session ID, network slice information, and DNN information included in the PDU session setup request (or PDU session establishment request). Further, the PDU session create request may include an ID of the terminal 101 for identifying the terminal 101, an ID of the AMF 103, location information of the terminal 101, and access network information to which the terminal 101 belongs.

At operation 120, the SMF 105 having received the PDU session create request from the AMF 103 identifies whether the SMF 105 has session related subscriber information of the terminal 101 related to the ID of the terminal 101 included in the corresponding message. If the SMF 105 does not have the subscriber information, the SMF 105 may request a unified data management (UDM) 107 to transmit the session related subscriber information to the SMF 105. The session related subscriber information of the terminal 101, which the SMF 105 receives from the UDM 107 and stores therein, includes a slice in which the terminal 101 subscribes, DNN information, corresponding slice, and configuration information of an available PDU session for each DNN.

In this case, the configuration information of the available PDU session for each DNN may include a validation rule including information on a service area that can be used by the corresponding PDU session, an available date, and a time zone condition. In this case, the service area information included in the validation rule may include area information indicated by physical geographic information, such as a global positioning system (GPS) or logical geographic information that can be discriminated by an indicator defined in the mobile communication system. Further, the time zone condition included in the validation rule may include date and time zone conditions of the corresponding area or date and time zone conditions based on the International Standard Time.

As shown in the non-limiting example of FIG. 1, at operation 125, the SMF 105 identifies the session related subscriber information of the terminal 101 that is transmitted from the UDM 107. If the corresponding PDU session request is allowable as the result of the identification, the SMF 105, at operation 130, transmits a PDU session create response for notifying that the corresponding PDU session connection request is allowed to the AMF 103. If the SMF 105 determines that the PDU session request should be rejected as the result of identifying the session related subscriber information of the terminal 101, the SMF 105 may transmit the PDU session create response notifying that the corresponding PDU session connection request has been rejected to the AMF 103.

In certain embodiments, if the validation rule of the corresponding session is included in the available PDU session configuration information in relation to the network slice and DNN of which the PDU session is requested by the terminal 101, the SMF 105, at operation 125, may determine whether the time information when the PDU session connection configuration request that is requested by the terminal 101 is received or the location condition at the corresponding time of the terminal 101 satisfies the condition determined in the corresponding validation rule. If the information related to the PDU session connection configuration request does not satisfy the corresponding condition, the SMF 105 may reject the corresponding PDU session connection configuration request, and may transmit a corresponding response to the AMF 103. If the SMF 105 rejects the corresponding PDU session connection configuration request, the terminal 101 may include information on a condition that the PDU session connection configuration request is re-transmittable or a condition that the corresponding PDU session connection configuration request is allowable in the response message, and may transmit the response message to the AMF 103.

Referring to the illustrative example of FIG. 1, at operation 130, if the SMF 105 rejects the PDU session connection request, the SMF 105 does not perform the subsequent procedures including operation 135.

After allowing the PDU session connection request of the AMF 103, the SMF 105, at operation 135, transmits an SM policy association setup request to a policy and control function (PCF) 106 in order to apply a policy and charging control rule related to the requested PDU session of the terminal 101. The SM policy association setup request may include a PDU session ID indicating the PDU session and a terminal ID. Further, the SM policy association setup request may include network slice information, terminal location information, and terminal time information related to the corresponding PDU session.

At operation 140, the PCF 106, having received the SM policy association setup request, may identify policy and charging control (hereinafter, PCC) rule information for the corresponding PDU session, and the PCF 106 may send a reply to the SMF 105. The PCC rule information for the corresponding PDU session may include a service data flow template capable of identifying an available service or application in the corresponding PDU session and charging information when the corresponding service flows are used. Further, the PCC rule information may include a validation rule containing conditions of a service area in which application of the corresponding PCC rule is allowed or related time.

Further, in certain embodiments according to this disclosure, the PCF 106, at operation 140, may identify the condition of the validation rule included in the PCC rule of the requested PDU session, and if the requested PDU session does not satisfy the condition of the validation rule, the PCF 106 may reject the SM policy association request.

At operation 150, the SMF 105 having received the SM policy association setup response identifies whether information on the reject of the SM policy association request is included in the SM policy association setup response or the condition of the validation rule included in the PCC rule included in the SM policy association setup response. If information on the current location or time of the terminal 101 having requested the current PDU session connection configuration does not satisfy the condition of the validation rule or if the information on the reject of the SM policy association setup request is received from the PCF 106, the SMF 105 may reject the PDU session connection request of the terminal 101.

According to some embodiments, if the SM policy association connection with the PCF 106 has been successfully established and the PCC rule has been successfully received at operation 150, and if the condition of the validation rule is satisfied, the SMF 105, at operation 155, configures an N4 session with a user plane function (UPF) 104 in order to transfer the indication of processing of the data associated with the PDU session and the related information to the UPF 104.

If the PDU session connection request of the terminal 101 is successfully allowed, the SMF 105, at operation 160, transmits, to the AMF 103, an N1 SM container message including information notifying that the PDU session connection to be transferred to the terminal 101 has succeeded and QoS information for flows to be used in the corresponding PDU session, and an N2 SM information including QoS information necessary for a base station 102, which will process user data using the corresponding PDU session, to process the corresponding data and information necessary for tunnel configuration with the UPF 104. If the PDU session connection request of the terminal 101 has been rejected at operation 150, the SMF 105 transmits the N1 SM container message including information notifying that the PDU session connection to be transferred to the terminal 101 has failed to the AMF 103.

At operation 165, the AMF 103 transfers an N2 PDU session request including information of the N1 SM container received from the SMF 105 and the N2 SM information to the base station 102.

As shown in the illustrative example of FIG. 1, at operation 170, the base station 102 configures a connection necessary for the PDU session configuration between the base station 102 and the terminal 101 based on the information received from the AMF 103, and transfers the N1 SM container message received from the AMF 103 to the terminal 101.

In certain embodiments, at operation 175, the base station 102 transmits, to the AMF 103, an N2 PDU session response including the N2 SM information including information of the result of the connection configuration for the corresponding PDU session and an address of the base station 102 necessary for the tunnel configuration with the UPF 104.

At operation 180, the AMF 103 transmits, to the SMF 105, a PDU session update request including the N2 SM information included in the N2 PDU session response received from the base station 102.

According to some embodiments, at operation 185, the SMF 105 updates the information necessary for the tunnel connection with the base station 102 in the UPF 104 with reference to the N2 SM information included in the PDU session update request received from the AMF 103.

At operation 190, the SMF 105 transmits a PDU session update response to the AMF 103 in response to the PDU session update request.

Figure 2:
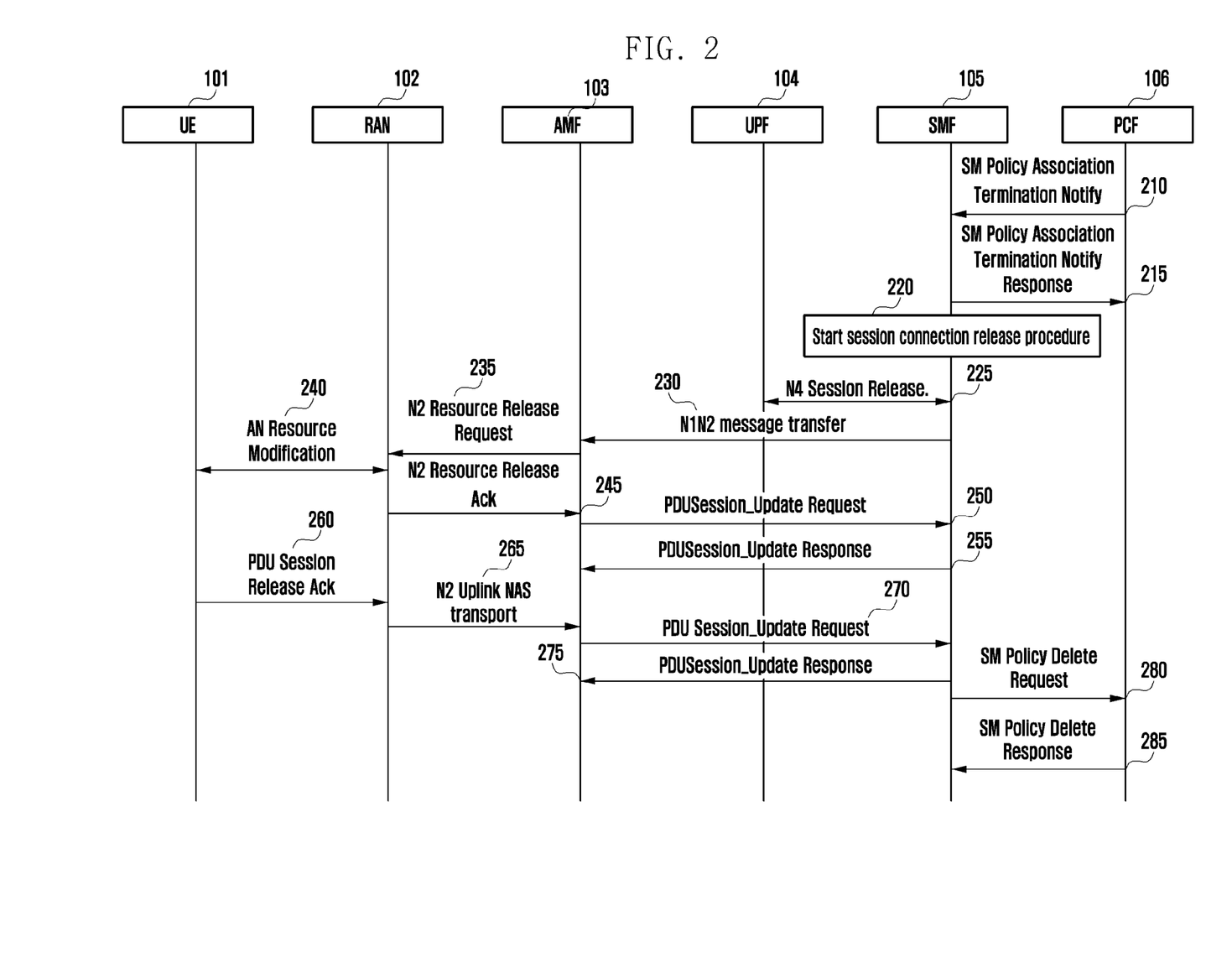
FIG. 2 illustrates an example of a procedure of releasing a PDU session connection according to at least one embodiment of this disclosure.

FIG. 2 illustrates an example of a procedure of releasing a PDU session connection according to at least one embodiment of the disclosure.

With reference to the non-limiting example of FIG. 2, at operation 210, the PCF 106 continuously manages whether the condition of the validation rule included in the PCC rule of the corresponding PDU session is satisfied while the PDU session connection is effective. If it is identified that the location of the terminal 101 received from the SMF 105 or the AMF 103 does not satisfy the condition included in the validation rule or the time condition included in the validation rule is not satisfied any more, the PCF 106 may transmit an SM policy association termination notify for requesting the release of the corresponding PDU session to the SMF 105.

According to some embodiments, at operation 215, the SMF 105, having received the SM policy association termination notify from the PCF 106 may transmit an SM policy association termination notify response to the PCF 106 in response to the corresponding message.

At operation 220, the SMF 105 may start a connection release procedure of the corresponding PDU session as requested by the PCF 106.

In some embodiments according to this disclosure, even in the case where the SMF 105 does not receive the SM policy association termination notify from the PCF 106, the SMF 105 continuously manage whether the condition of the validation rule included in the PCC rule associated with the corresponding PDU is satisfied, and if it is identified that the location of the terminal 101 received from the AMF 103 does not satisfy the condition included in the validation rule or the time condition included in the validation rule is not satisfied any more, the SMF 105 may start the procedure of releasing the PDU session connection.

According to some embodiments, at operation 225, the SMF 105 may perform an N2 session release procedure for releasing an N4 session associated with the corresponding PDU session with respect to the UPF 104.

At operation 230, the SMF 105 transmits, to the AMF 103, an N1N2 message transfer including N1 information and N2 information for requesting the terminal 101 and the base station (radio access network (RAN)) 102 to release the corresponding PDU session. If the connection between the base station 102 and the UPF 104 for the corresponding PDU session is in a deactivated state, the N2 information may be omitted.

At operation 235, the AMF 103 may transmit, to the base station 102, an N2 resource release request for requesting the release of the corresponding PDU session including the N1 information and N2 information received from the SMF 105.

In various embodiments, at operation 240, the base station 102 transfers the N1 information for requesting the PDU session release to the terminal 101. Further, the base station 102 proceeds with a resource release procedure between the base station 102 and the terminal 101 for the corresponding PDU session.

At operation 245, the base station 102 transfers, to the AMF 103, an N2 resource release Ack notifying that the resource for the PDU session between the base station 102 and the terminal 101 has been released in response to the N2 resource release request.

At operation 250, the AMF 103 transmits a PDU session update request to the SMF 105 in order to transfer the N2 resource release Ack received from the base station 102 to the SMF 105.

In various embodiments, at operation 255, the SMF 105 transmits a PDU session update response to the AMF 103 in response to the PDU session update request.

At operations 260 and 265, the terminal 101 may transfer a PDU session release Ack notifying that the PDU session release has been performed to the AMF 103 through the base station 102.

At operation 270, the AMF 103 having received this may transmit a PDU session update request to the SMF 105 in order to transmit the PDU session release Ack.

At operation 275, the SMF 105 may transmit a PDU session update response to the AMF 103 in response to the PDU session update request.

After receiving the PDU session update request notifying the release of the PDU session resource from the AMF 103 at operation 250 or 270, the SMF 105 may exchange an SM policy delete request and a response with the PCF 106 in order to perform the PDU session release with the PCF 106 at operations 280 and 285.

Figure 3:
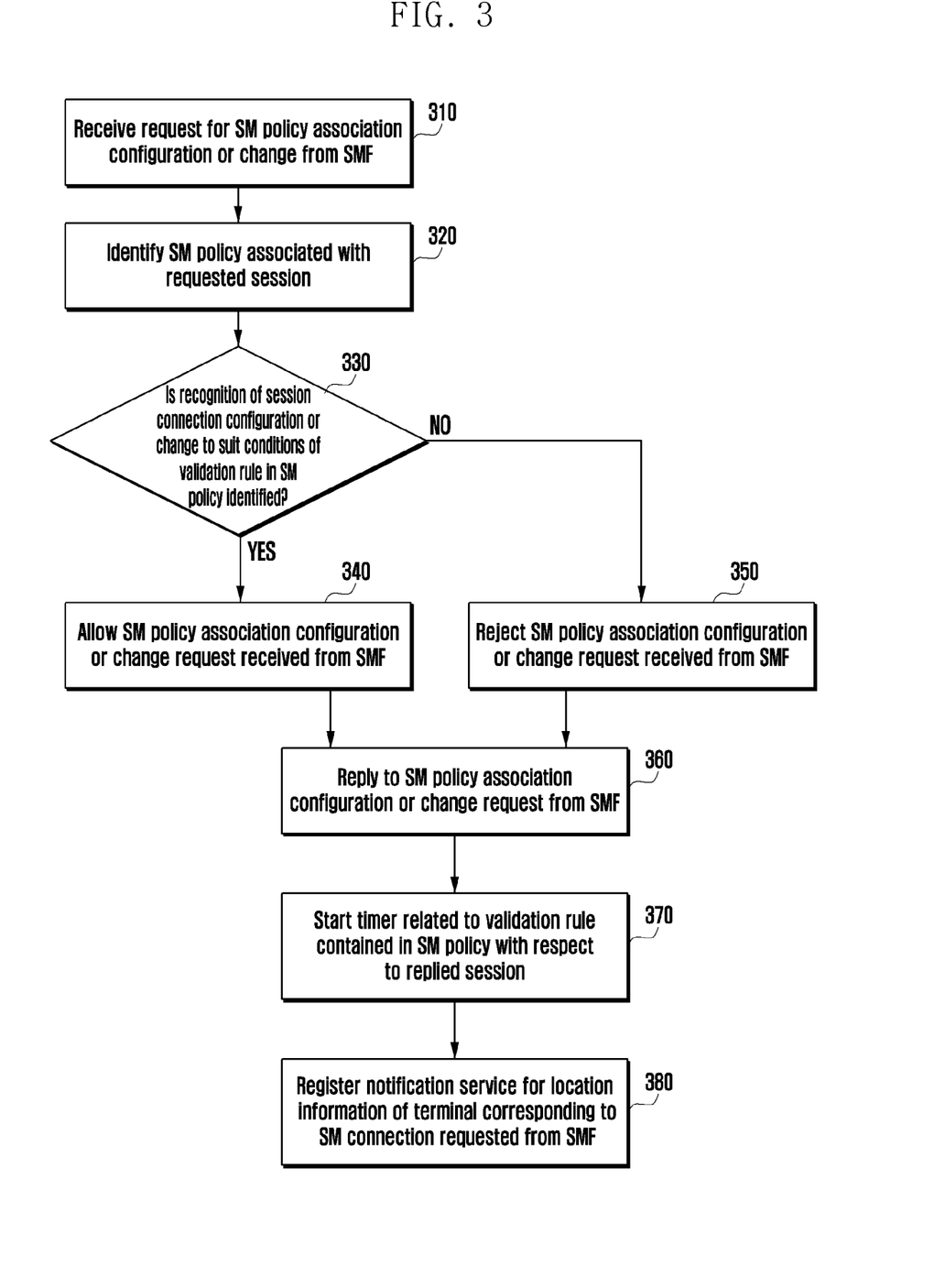
FIG. 3 illustrates an example of a procedure of managing a PDU session connection request by a PCF according to various embodiments of this disclosure.

FIG. 3 illustrates an example of a procedure of managing a PDU session connection request by a PCF according to some embodiments of the disclosure.

With reference to the illustrative example of FIG. 3, at operation 310, the PCF 106 may receive, from the SMF 105, a message for requesting a new association configuration of an SM policy for a new PDU session or a message for requesting an association update configuration of an SM policy for an existing configured PDU session.

In some embodiments, at operation 320, the PCF 106 identifies the PCC rule of the PDU session and other policy information associated with the requested new association configuration of the SM policy or association update configuration.

At operation 330, if the validation rule is configured in the PCC rule, the PCF 106 may identify whether location information of the related terminal 101 and the requested time included in the request received at operation 310 satisfy the condition determined by the validation rule.

Depending on whether to satisfy the condition of the validation rule performed at operation 330, the PCF 106, at operations 340 and 350, may allow or reject the new configuration or change request of the SM policy association received from the SMF 105. If the SM policy association related request is allowed (operation 340), the PCF 106, at operation 360, may notify the SMF 105 that the related request has been allowed, and may transfer the PCC rule of the related PDU session and other policy information to the SMF 105. Further, if the SM policy association related request is rejected (operation 350), the PCF 106, at operation 360, may notify the SMF 105 that the related request has been rejected.

In various embodiments according to this disclosure, the PCF 106 may transfer the PCC rule including the validation rule and other policy information to the SMF 105 without determining whether the condition of the validation rule is satisfied at operation 330.

At operation 370, the PCF 106 may set a timer for determining whether the corresponding conditions are satisfied in accordance with the conditions of the validation rule included in the PCC rule transferred to the SMF 105. For example, if it is configured that the PDU session starts at a specific time and is then released after the specific time, the PCF 106 may set the timer based on a time period from the current time to the time of releasing the PDU session.

At operation 380, the PCF 106 may continuously monitor whether the location condition of the terminal 101 of the validation rule is satisfied by registering a notification service for the location information of the terminal 101 in the AMF 103 serving the SMF 105 or the terminal 101.

According to some embodiments, operations 370 and 380 may be performed together, or only either of the operations 370 and 380 may be performed.

Figure 4:
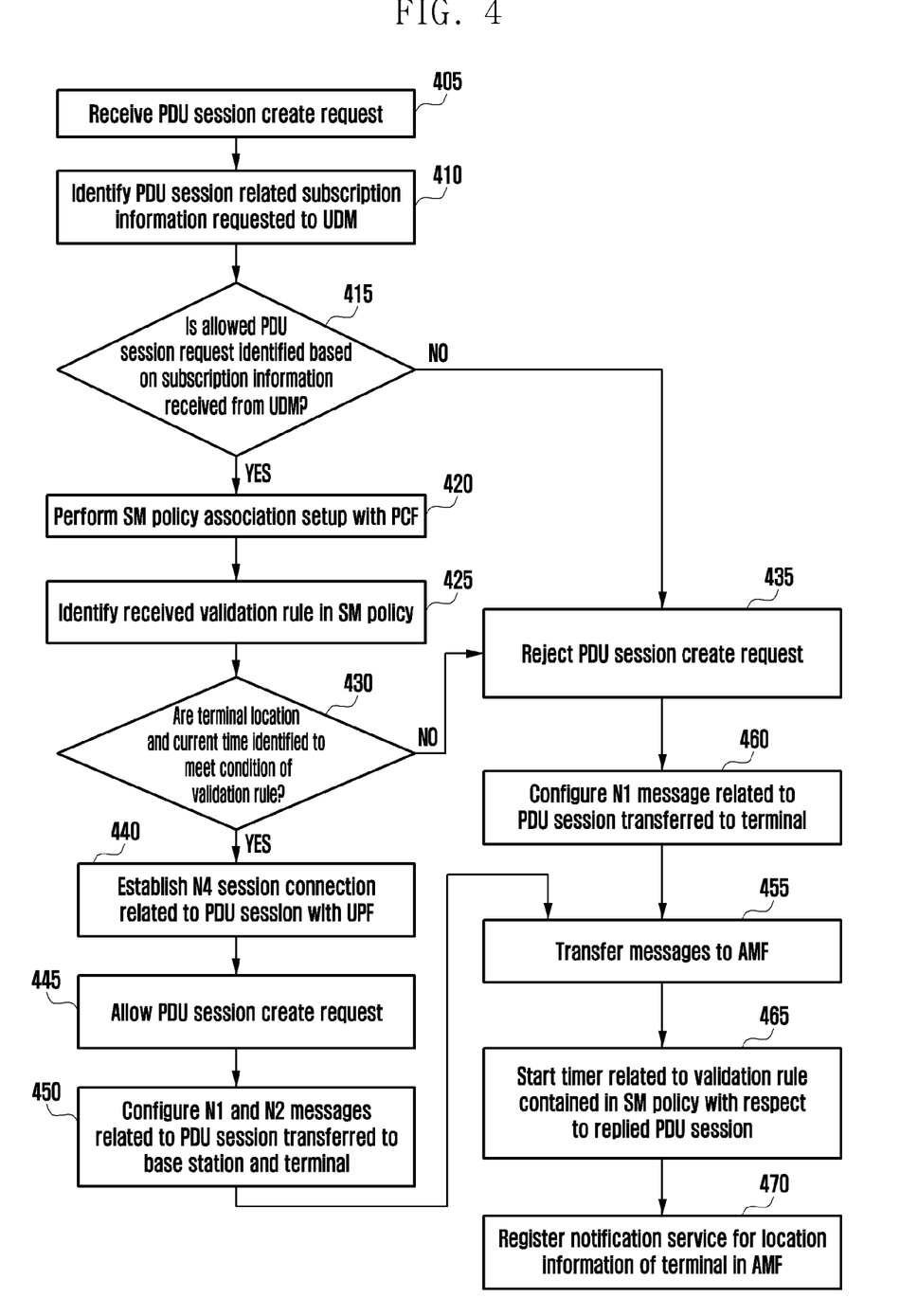
FIG. 4 illustrates an example of a procedure of managing a PDU session connection request by an SMF according to some embodiments of this disclosure.

FIG. 4 illustrates an example of a procedure of managing a PDU session connection request by an SMF according to at least one embodiment of the disclosure.

With reference to the illustrative example of FIG. 4, the SMF 105, at operation 405, receives a request for PDU session connection configuration of the terminal 101 through the AMF 103.

At operation 410, the SMF 105 may identify subscription information by requesting session related subscription information of the terminal 101 from the UDM 107.

According to some embodiments, at operation 415, the SMF 105 may determine whether the PDU session connection request is an allowable request based on the session related subscription information received from the UDM 107.

If the PDU session connection request is unable to be allowed based on the session related subscription information of the UDM 107, the SMF 105, at operation 435, may reject the corresponding PDU session connection request. If the PDU session connection request is allowable based on the session related subscription information of the UDM 107, the SMF 105, at operation 420, may perform an SM policy association setup procedure to receive PCC rule and policy information for the PDU session configuration with the PCF 106.

At operation 425, the SMF 105 may identify whether the PDU session validation rule exists in the received PCC rule in accordance with the performing of the SM policy association setup procedure.

According to some embodiments, if the validation rule is set in the PCC rule, the SMF 105, at operation 430, may identify whether the location information of the related terminal 101 and the requested time included in the request received at operation 405 satisfy the condition determined by the validation rule.

If the location information of the terminal 101 and the requested time do not satisfy the condition of the validation rule, the SMF 105, at operation 435, rejects the PDU session connection establishment request.

In some embodiments, if the location information of the terminal 101 and the requested time satisfy the condition of the validation rule, the SMF 105, at operation 440, performs an N4 session connection establishment procedure to transfer the information for processing the PDU session with the UPF 104.

If the PDU session connection request is allowed at operation 445, the SMF 105, at operation 450, may configure N1 and N2 messages to be transferred to the base station 102 and the terminal 101 to configure the PDU session connection. If the PDU session connection request is rejected, the SMF 105, at operation 460, may configure only the N1 message for notifying that the PDU session connection has been rejected without the N2 message.

At operation 455, the SMF 105 may transfer the configured N1 and N2 messages to the AMF 103.

According to some embodiments, at operation 465, the SMF 105 may set the timer for determining whether the corresponding conditions are satisfied in accordance with the conditions of the validation rule included in the PDU session related PCC rule. For example, if it is configured that the PDU session starts at a specific time and is then released after the specific time, the SMF 105 may set the timer based on a time period from the current time to the time of releasing the PDU session.

At operation 470, the SMF 105 may continuously monitor whether the location condition of the terminal 101 of the validation rule is satisfied by registering a notification service for the location information of the terminal 101 in the AMF 103.

In certain embodiments, operations 465 and 470 may be performed after the operation 455. Further, although being omitted in some embodiments, a response procedure for notifying that the PDU session connection has successfully been established or additional configuration procedures necessary for the PDU session connection establishment with the terminal 101 and the base station 102 may be performed. In this case, the operations 465 and 470 may be performed after the response procedure for notifying that the PDU session connection has successfully been established or the additional configuration procedures necessary for the PDU session connection establishment with the terminal 101 and the base station 102 are performed.

According to some embodiments, operations 465 and 470 may be performed together, or only either of the operations 465 and 470 may be performed.

Figure 5:
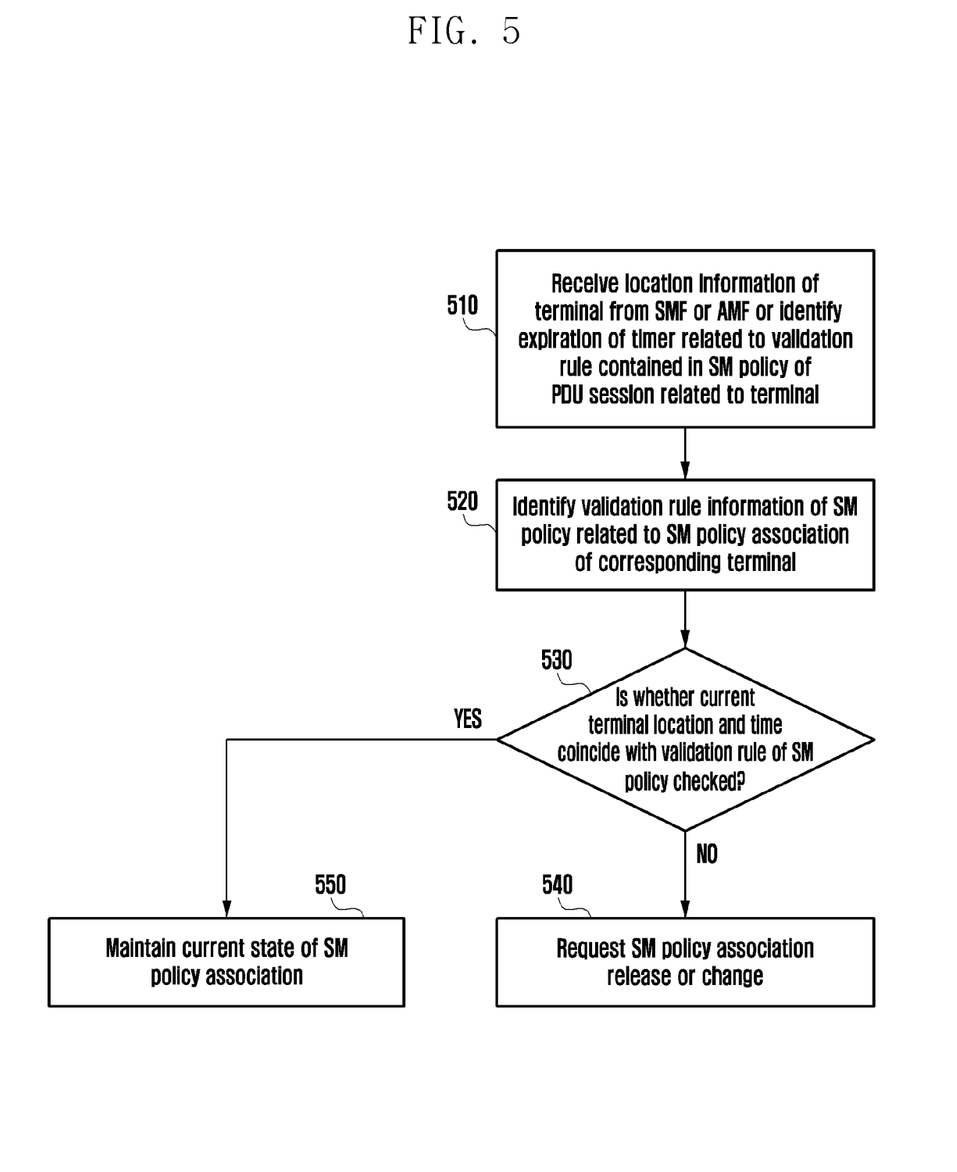
FIG. 5 illustrates an example of a procedure of managing a preconfigured PDU session connection by a PCF according to various embodiments of this disclosure.

FIG. 5 illustrates an example of a procedure of managing a preconfigured PDU session connection by a PCF according to various embodiments of the disclosure.

With reference to the non-limiting example of FIG. 5, the PCF 106, at operation 510, may identify the expiration of the timer set to monitor whether the validation rule configured at operations 370 and 380 in the example of FIG. 3 is satisfied. Further, the PCF 106 may receive location information of the terminal 101 from the AMF 103. Further, at operation 520, the PCF 106 may perform a procedure for identifying information of the validation rule.

According to some embodiments, at operation 530, the PCF 106 determines whether the current time does not satisfy the validation rule or whether the location of the terminal 101 does not satisfy the condition determined in the validation rule.

If the condition determined in the validation rule is not satisfied, the PCF 106, at operation 540, may request the SMF 105 to release or change SM policy association. If the condition determined in the validation rule is satisfied, the PCF 106, at operation 550, maintains the corresponding SM policy association.

Figure 6:
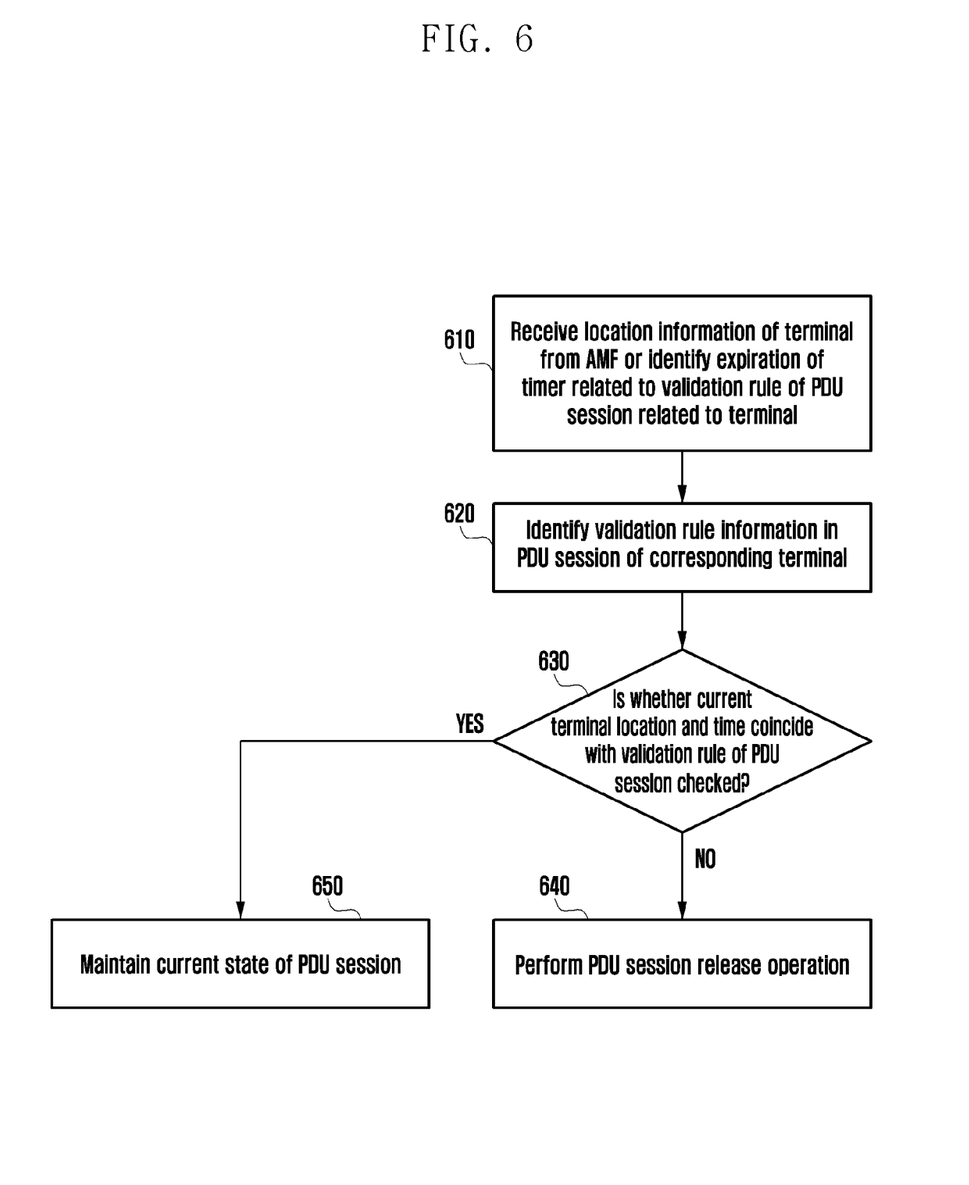
FIG. 6 illustrates an example of a procedure of managing a preconfigured PDU session connection by an SMF according to at least one embodiment of the present disclosure.

FIG. 6 illustrates an example of a procedure of managing a preconfigured PDU session connection by an SMF according to various embodiments of the disclosure.

With reference to the non-limiting example of FIG. 6, the SMF 105, at operation 610, may identify the expiration of the timer set to monitor whether the validation rule configured at operations 465 and 470 in the non-limiting example of FIG. 4 is satisfied. Further, the SMF 105 may receive location information of the terminal 101 from the AMF 103. Further, at operation 620, the SMF 105 may perform a procedure for identifying information of the validation rule.

At operation 630, the SMF 105 determines whether the current time does not satisfy the validation rule or whether the location of the terminal 101 does not satisfy the condition determined in the validation rule.

If the condition determined in the validation rule is not satisfied, the SMF 105, at operation 640, may perform a PDU session release operation. If the condition determined in the validation rule is satisfied, the SMF 105, at operation 650, maintains the corresponding PDU session in the current state.

Figure 7:
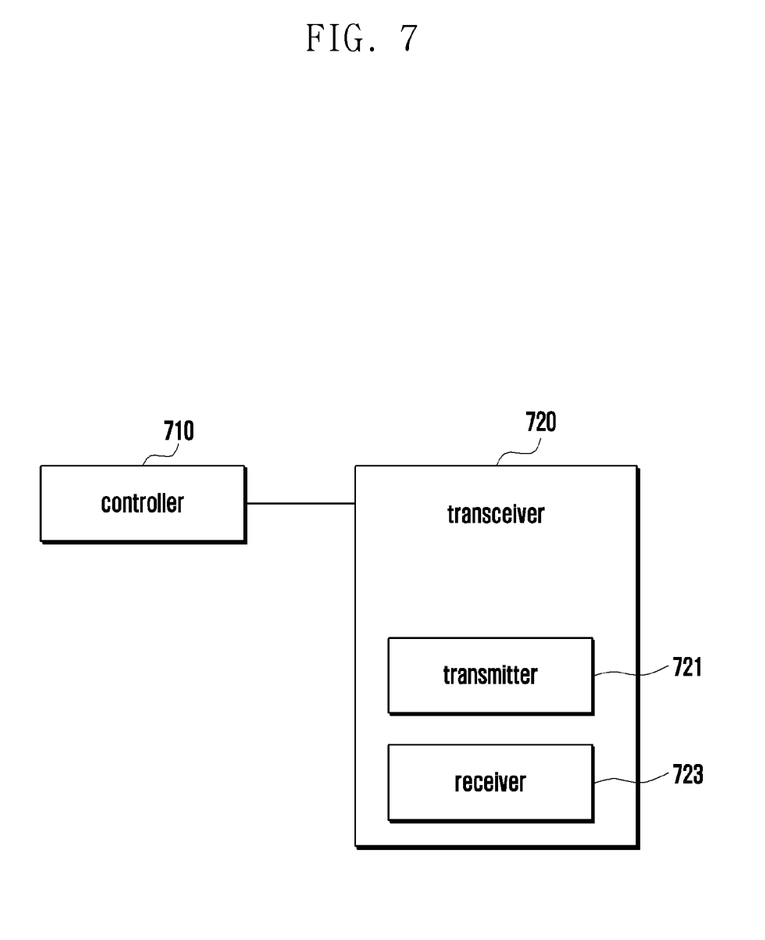
FIG. 7 illustrates, in block diagram format, an example of a terminal according to at least one embodiment of this disclosure.

FIG. 7 illustrates an example of a configuration of a terminal according to various embodiments of this disclosure.

Referring to the non-limiting example of FIG. 7, a terminal (for example, terminal 101 in FIG. 1) according to some embodiment of the disclosure may include a transceiver 720 and a controller 710 controlling the overall operation of the terminal 101. Further, the transceiver 720 may include a transmitter 721 and a receiver 723.

According to certain embodiments, transceiver 720 may transmit and receive signals with other network entities.

The controller 710 may control the terminal 101 to perform any one of the operations according to the above-described embodiments. On the other hand, it is not always necessary for the controller 710 and the transceiver 720 to be implemented by separate modules, but they may be implemented as one constituent element in the form of a single chip. Further, the controller 710 and the transceiver 720 may be electrically connected to each other. For example, the controller 710 may be a circuit, an application-specific circuit, or at least one processor. Further, the operations of the terminal 101 may be implemented by providing a memory device in which corresponding program codes are stored in a certain constituent element of the terminal 101.

Figure 8:
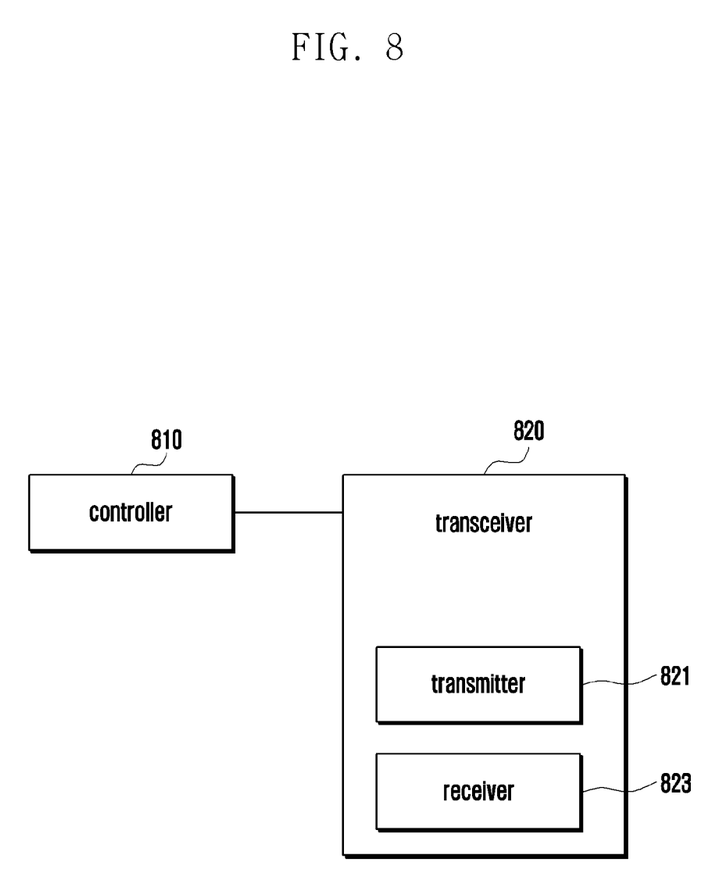
FIG. 8 illustrates, in block diagram format, an example of a network entity according to certain embodiments of this disclosure.

FIG. 8 illustrates an example of a configuration of a network entity according to various embodiments' disclosure.

Referring to the non-limiting example of FIG. 8, a network entity according to various embodiments of the disclosure may include a transceiver 820 and a controller 810 controlling the overall operation of the network entity. Further, the transceiver 820 may include a transmitter 821 and a receiver 823.

The transceiver 820 may transmit and receive signals with other network entities.

According to some embodiments, controller 810 may control the network entity to perform any one of the operations according to the above-described embodiments. On the other hand, it is not always necessary for the controller 810 and the transceiver 820 to be implemented by separate modules, but they may be implemented as one constituent element in the form of a single chip. Further, the controller 810 and the transceiver 820 may be electrically connected to each other. For example, the controller 810 may be a circuit, an application-specific circuit, or at least one processor. Further, the operations of the network entity may be implemented by providing a memory device in which corresponding program codes are stored in a certain constituent element of the network entity.

The network entity may be, without limitation, any one of the base station 102, AMF 103, SMF 105, UPF 104, PCF 106, and UDM 107.

It should be noted that the configurations described with reference to FIGS. 1 to 8, examples of control/data signal transmission methods, operational procedures, and constituent elements are not intended to limit the scope of the disclosure. That is, it should not be construed that all constituent elements described in FIGS. 1 to 8, entities, or operations are essential constituent elements to embody the disclosure, but only parts of the constituent elements may be implemented to embody the disclosure within a range that does not hamper the essence of the disclosure.

The operations of the base station or the terminal as described above may be implemented by providing a memory device in which the corresponding program codes are stored in a certain constituent element of the base station or the terminal device. That is, in order to execute the above-described operations, the controller of the base station or the terminal device may read and execute the program codes stored in the memory device through a processor or a central processing unit (CPU).

Various constituent elements of the entity, the base station, the terminal device, or modules as described above in the description may operate using hardware circuits, for example, complementary metal oxide semiconductor based logic circuits, firmware, software, and/or hardware and firmware, and/or combinations of software inserted into a machine readable medium. As an example, various electrical structures and methods may be embodied using transistors, logic gates, and electrical circuits such as application specific integrated circuits.

Although preferred embodiments of the disclosure have been described in the specification, it will be apparent that various modifications are possible within the scope of the disclosure. Accordingly, the scope of the disclosure should not be limited to the above-described embodiments, but should be defined by not only the claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) entity in a communication system, the method comprising:

transmitting, to a policy and charging control function (PCF) entity, a first message for applying a policy and charging control (PCC) rule to a protocol data unit (PDU) session, wherein the first message comprises at least one of location information of a terminal and time information of the terminal, wherein the PCC rule is related to a validation rule and wherein the validation rule includes at least one of valid location information and valid time information;

receiving, from the PCF entity, a second message for accepting a session management policy association request as a response to the first message, in case that the validation rule is determined to be satisfied by the PCF entity based on the at least one of the location information of the terminal and the time information of the terminal and the at least one of the valid location information and the valid time information; and receiving, from the PCF entity, a third message for rejecting the session management policy association request as a response to the first message, in case that the validation rule is determined to be unsatisfied by the PCF entity based on the at least one of the location information of the terminal and the time information of the terminal and the at least one of the valid location information and the valid time information.

2. The method of claim 1,
wherein the first message further comprises at least one of information on a network slice, information on a data network name, an identifier of the terminal, and information on an access network of the terminal.

3. The method of claim 1,
wherein the first message includes a session management policy association request message, and
wherein the second message or the third message includes a session management policy association response message.

4. The method of claim 1, further comprising:
receiving, from the PCF entity, a fourth message to request a releasing of the PDU session, in case that after successful PDU session setup, the validation rule is unsatisfied.

5. A method performed by a policy and control function (PCF) entity in a communication system, the method comprising:
receiving, from a session management function (SMF) entity, a first message for applying a policy and charging control (PCC) rule to a protocol data unit (PDU) session, wherein the first message comprises at least one of location information of a terminal and time information of the terminal, wherein the PCC rule is related to a validation rule and wherein the validation rule includes at least one of valid location information and valid time information;
determining whether the validation rule is satisfied based on the at least one of the location information of the terminal and the time information of the terminal and the at least one of the valid location information and the valid time information;
transmitting, to the SMF entity, a second message for accepting a session management policy association request as a response to the first message, in case that the validation rule is determined to be satisfied; and
transmitting, to the SMF entity, a third message for rejecting the session management policy association request as a response to the first message, in case that the validation rule is determined to be unsatisfied.

6. The method of claim 5,
wherein the first message further comprises at least one of information on a network slice, information on a data network name, an identifier of the terminal, and information on an access network of the terminal.

7. The method of claim 5, further comprising:
monitoring whether the validation rule is satisfied, after a PDU session setup is successful; and
transmitting, to the SMF entity, a fourth message to request a releasing of the PDU session, in case that the validation rule is not satisfied.

8. A session management function (SMF) entity in a communication system, the SMF entity comprising:
a transceiver; and
a controller coupled with the transceiver and configured to:
transmit, to a policy and charging control function (PCF) entity, a first message for applying a policy and charging control (PCC) rule to a protocol data unit (PDU) session wherein the first message comprises at least one of location information of a terminal and time information of the terminal, wherein the PCC rule is related to a validation rule and wherein the validation rule includes at least one of valid location information and valid time information,
receive, from the PCF entity, a second message for accepting a session management policy association request as a response to the first message, in case that the validation rule is determined to be satisfied by the PCF entity based on the at least one of the location information of the terminal and the time information of the terminal and the at least one of the valid location information and the valid time information, as a response to the first message, and
receive, from the PCF entity, a third message for rejecting the session management policy association request as a response to the first message, in case that the validation rule is determined to be unsatisfied by the PCF entity based on the at least one of the location information of the terminal and the time information of the terminal and the at least one of the valid location information and the valid time information.

9. The SMF entity of claim 8,
wherein the first message further comprises at least one of information on a network slice, information on a data network name, an identifier of the terminal, and information on an access network of the terminal.

10. The SMF entity of claim 8,
wherein the first message includes a session management policy association request message, and
wherein the second message or the third message includes a session management policy association response message.

11. The SMF entity of claim 8, wherein the controller is further configured to:
receive, from the PCF entity, a fourth message to request a releasing of the PDU session, in case that after successful PDU session setup, the validation rule is unsatisfied.

12. A policy and control function (PCF) entity in a communication system, the PCF entity comprising:
a transceiver; and
a controller coupled with the transceiver and configured to:
receive, from a session management function (SMF) entity, a first message for applying a policy and charging control (PCC) rule to a protocol data unit (PDU) session wherein the first message comprises at least one of location information of a terminal and time information of the terminal, wherein the PCC rule is related to a validation rule and wherein the validation rule includes at least one of valid location information and valid time information,
determine whether the validation rule is satisfied based on the at least one of the location information of the terminal and the time information of the terminal and the at least one of the valid location information and the valid time information,
transmit, to the SMF entity, a second message for accepting a session management policy association request as a response to the first message, in case that the validation rule is determined to be satisfied, and
transmit, to the SMF entity, a third message for rejecting the session management policy association request as a response to the first message, in case that the validation rule is determined to be unsatisfied.

13. The PCF entity of claim 12,
wherein the first message further comprises at least one of information on a network slice, information on a data network name, an identifier of the terminal, and information on an access network of the terminal.

14. The PCF entity of claim 12, wherein the controller is further configured to:
monitor whether the validation rule is satisfied, after a PDU session setup is successful, and
transmit, to the SMF entity, a fourth message to request a releasing of the PDU session in case that the validation rule is not satisfied.

15. The PCF entity of claim 12,
wherein the first message includes a session management policy association request message, and
wherein the second message or the third message includes a session management policy association response message.

16. The method of claim 5,
wherein the first message includes a session management policy association request message, and
wherein the second message or the third message includes a session management policy association response message.

\* \* \* \* \*